(12) United States Patent
Kikuchi et al.

(10) Patent No.: US 12,497,301 B2
(45) Date of Patent: Dec. 16, 2025

(54) HEAT-RESISTANT MEMBER

(71) Applicant: KYOCERA Corporation, Kyoto (JP)

(72) Inventors: Kentaro Kikuchi, Kirishima (JP); Takahiro Ueno, Kirishima (JP); Satoshi Toyoda, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 832 days.

(21) Appl. No.: 17/791,417

(22) PCT Filed: Dec. 8, 2020

(86) PCT No.: PCT/JP2020/045617
§ 371 (c)(1),
(2) Date: Jul. 7, 2022

(87) PCT Pub. No.: WO2021/140813
PCT Pub. Date: Jul. 15, 2021

(65) Prior Publication Data
US 2023/0051919 A1   Feb. 16, 2023

(30) Foreign Application Priority Data
Jan. 10, 2020 (JP) .................................. 2020-003203

(51) Int. Cl.
*C01F 7/162* (2022.01)

(52) U.S. Cl.
CPC .......... *C01F 7/162* (2013.01); *C01P 2002/32* (2013.01); *C01P 2006/37* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 4,101,615 A * | 7/1978 | Horikiri | C04B 35/62236 |
| | | | 264/627 |
| 2010/0213822 A1* | 8/2010 | Shimooka | C09K 11/77342 |
| | | | 313/503 |
| 2014/0021661 A1 | 1/2014 | Koike et al. | |
| 2020/0148596 A1 | 5/2020 | Iida et al. | |
| 2020/0308014 A1* | 10/2020 | Oki | C30B 29/26 |
| 2022/0073430 A1* | 3/2022 | Kikuchi | B32B 18/00 |

FOREIGN PATENT DOCUMENTS

| | | |
|---|---|---|
| CN | 103502182 A | 1/2014 |
| JP | 4-132657 A | 5/1992 |
| WO | 2018/124024 A1 | 7/2018 |

* cited by examiner

*Primary Examiner* — John J Figueroa
(74) *Attorney, Agent, or Firm* — Procopio, Cory, Hargreaves & Savitch LLP

(57) ABSTRACT

A heat-resistant member (1) according to the present disclosure contains alumina as a main component, and magnesium aluminate and boron. The content percentage of the magnesium aluminate at the surface is higher than the content percentage of the magnesium aluminate in a surface layer section located directly below the surface.

15 Claims, 6 Drawing Sheets

| LOT | COMPOUNDED BORON CONTENT | ICP BORON AMOUNT | | | |
|---|---|---|---|---|---|
| | | AIR-FIRED | | REDUCTION-FIRED | |
| | | SURFACE LAYER | INNER PORTION | SURFACE LAYER | INNER PORTION |
| L1 | 0.4 | 0.25 | 0.31 | 0.15 | 0.26 |
| L2 | 0.9 | 0.60 | 0.71 | 0.38 | 0.65 |
| L3 | 1.5 | 1.35 | 1.58 | 0.88 | 1.31 |
| L4 | 2.5 | 2.60 | 2.85 | 1.70 | 2.30 |

| LOT | L1 | | | L2 | | | L3 | | L4 | |
|---|---|---|---|---|---|---|---|---|---|---|
| COMPOUNDED BORON CONTENT | 0.4 | | | 0.9 | | | 1.5 | | 2.5 | |
| FIRING ATMOSPHERE | | | | | | REDUCTION | | | | |
| PORTION | SURFACE LAYER SECTION | INNER PORTION | SURFACE | SURFACE LAYER SECTION | INNER PORTION | SURFACE LAYER SECTION | INNER PORTION | SURFACE LAYER SECTION | INNER PORTION | |
| ICP BORON AMOUNT | 0.15 | 0.26 | - | 0.38 | 0.65 | 0.88 | 1.31 | 1.70 | 2.30 | |
| XRD PEAK INTENSITY ALUMINA RATIO (%) — ANORTHITE | 6 | 9 | 32 | 14 | 13 | 14 | 13 | 6 | 1 | |
| XRD PEAK INTENSITY ALUMINA RATIO (%) — SPINEL | 3 | 8 | 20 | 16 | 13 | 12 | 12 | 0 | 0 | |

FIG. 2

| LOT | COMPOUNDED BORON CONTENT | ICP BORON AMOUNT | | | |
|---|---|---|---|---|---|
| | | AIR-FIRED | | REDUCTION-FIRED | |
| | | SURFACE LAYER | INNER PORTION | SURFACE LAYER | INNER PORTION |
| L1 | 0.4 | 0.25 | 0.31 | 0.15 | 0.26 |
| L2 | 0.9 | 0.60 | 0.71 | 0.38 | 0.65 |
| L3 | 1.5 | 1.35 | 1.58 | 0.88 | 1.31 |
| L4 | 2.5 | 2.60 | 2.85 | 1.70 | 2.30 |

HEAT-RESISTANT MEMBER

TECHNICAL FIELD

The present disclosure relates to a heat-resistant member.

BACKGROUND ART OF INVENTION

From the perspectives of insulating properties and heat resistance, ceramics are widely used in heat-resistant members (see, for example, Patent Document 1).

CITATION LIST

Patent Literature

Patent Document 1: JP 04-132657 A

SUMMARY

A heat-resistant member according to one aspect of the present disclosure includes alumina as a main component, and magnesium aluminate and boron, and a content percentage of the magnesium aluminate at a surface is higher than a content percentage of the magnesium aluminate in a surface layer section located directly below the surface.

A heat-resistant member according to one aspect of the present disclosure includes alumina as a main component, and magnesium aluminate and boron, and a content percentage of the magnesium aluminate in a surface layer section including a surface is higher than a content percentage of the magnesium aluminate at an inner portion deeper than the surface layer section in a depth direction from the surface.

BRIEF DESCRIPTION OF THE DRAWINGS

FIG. 2 is a table presenting measurement results obtained through X-ray diffraction of heat-resistant members according to embodiments.

DESCRIPTION OF EMBODIMENTS

Modes (hereinafter, referred to as "embodiments") for carrying out a heat-resistant member according to the present disclosure will be described in detail below with reference to the drawings. Note that the embodiments described below are not intended to limit the heat-resistant member according to the present disclosure. Embodiments can be appropriately combined so as not to contradict each other in terms of processing content. In the following embodiments, the same portions are denoted by the same reference signs, and duplicated explanations are omitted.

In the embodiments described below, expressions such as "constant", "orthogonal", "vertical", and "parallel" may be used, but these expressions do not need to be exactly "constant", "orthogonal", "vertical", and "parallel". In other words, it is assumed that the above expressions allow deviations in manufacturing accuracy, installation accuracy, or the like.

Figure 1:
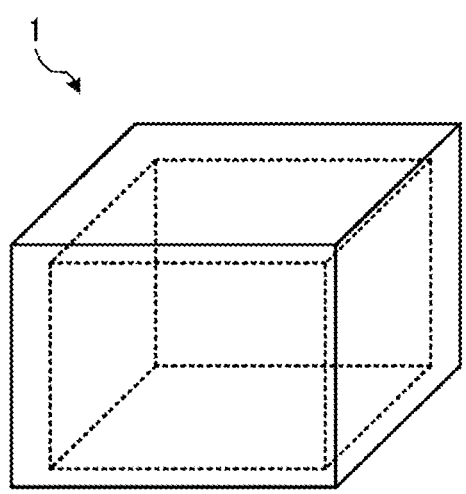
FIG. 1 is a schematic perspective view of a heat-resistant member according to an embodiment.

FIG. 1 is a schematic perspective view of a heat-resistant member according to an embodiment. As illustrated in FIG. 1, the heat-resistant member 1 according to the embodiment is, for example, a container that can be hermetically sealed. The shape of the heat-resistant member 1 is not limited to the present example, and may be any shape such as a plate shape, a frame shape, and a pillar shape.

Ceramics are widely used in heat-resistant members from the perspectives of insulating properties and heat resistance. As a heat-resistant member of this type, in some cases a heat-resistant member made from a ceramic having excellent thermal shock resistance is desired, such as a ceramic member that is exposed to high-temperature molten metal, and a member that is used in a combustion chamber wall of an internal combustion engine or in a fuel injection nozzle.

The heat-resistant member 1 according to an embodiment is formed from an aluminum oxide-based ceramic. When the heat-resistant member 1 is made from an aluminum oxide-based ceramic, in comparison to other ceramics, the heat-resistant member 1 exhibits excellent mechanical characteristics while being relatively inexpensive in terms of both raw material costs and manufacturing costs. An aluminum oxide-based ceramic is a material containing 70 mass % or more of alumina ($Al_2O_3$) from among 100 mass % of all components constituting the ceramic.

The material of the heat-resistant member 1 can be confirmed by the following method, for example. First, a heat-resistant member 1 to be confirmed is measured using an X-ray diffractometer (XRD), and an obtained value of 2θ (where 2θ indicates a diffraction angle) is matched with a JCPDS card. Next, a quantitative analysis of aluminum (Al) is performed using an ICP emission spectrophotometer (ICP) or an X-ray fluorescent (XRF) analyzer. Then, if the content percentage, which is a value in terms of aluminum oxide ($Al_2O_3$) as calculated from the content percentage of Al measured by ICP or XRF, is 70 mass % or greater, the material of the heat-resistant member 1 is an aluminum oxide-based ceramic.

The heat-resistant member 1 according to an embodiment contains magnesium aluminate and boron (B).

The magnesium aluminate is, for example, spinel ($MgAl_2O_4$). The magnesium aluminate may also be a magnesium aluminate having a composition in which the ratio of Mg, Al and O is varied from the stoichiometric ratio indicated by the chemical formula of spinel ($MgAl_2O_4$). That is, the composition of the magnesium aluminate is not required to fully match the stoichiometric ratio indicated by the chemical formula of spinel, and for example, unavoidable fluctuations in the ratio of each element can be tolerated. Magnesium aluminate is referred to simply as "spinel" below.

In the heat-resistant member 1 according to an embodiment, the content percentage of spinel on the surface of the heat-resistant member 1 is higher than the content percentage of spinel in the surface layer section located directly below the surface. As a result, the heat-resistant member 1 according to the embodiment has excellent thermal shock resistance.

In the heat-resistant member 1 according to an embodiment, the content percentage of the spinel in the surface layer section of the heat-resistant member 1 is higher than the content percentage of spinel in an inner portion. As a result, the heat-resistant member 1 according to the embodiment further excels in thermal shock resistance.

Here, the surface layer section of the heat-resistant member 1 refers to, of a region in the depth direction from an outer surface of the heat-resistant member 1, a region including the surface of the heat-resistant member 1. For example, the surface layer section of the heat-resistant member 1 is a region from the outer surface (outermost surface) of the heat-resistant member 1 to a depth of 0.5 mm. The inner portion of the heat-resistant member 1 refers to a region deeper than the surface layer section in the depth direction described above. For example, the inner portion of the heat-resistant member 1 is a region exceeding a depth of 0.5 mm from the outer surface of the heat-resistant member 1. Preferably, the inner portion of the heat-resistant member 1 is a central region in the depth direction of the heat-resistant member 1. The surface of the heat-resistant member 1 is a region from the outer surface (outermost surface) of the heat-resistant member 1 to a depth of several μm. The outer surface of the heat-resistant member 1 is, of the surface of the heat-resistant member 1, a surface in contact with the external atmosphere (that is, an interface with the external atmosphere).

The reason why the heat-resistant member 1 according to the present embodiment has superior thermal shock resistance is thought to be as follows. That is, the thermal conductivity of spinel is lower than that of alumina. Thus, when the content percentage of the spinel in the surface layer section of the heat-resistant member 1 is higher than the content percentage of the spinel in the inner portion, heat conduction from the surface layer section of the heat-resistant member 1 to the inner portion thereof is suppressed, and thus an increase in the temperature of the inner portion of the heat-resistant member 1 can be suppressed. When the heat-resistant member 1 is fractured by thermal shock, the inner portion of the heat-resistant member 1 is likely to be a fracturing source. Therefore, fracturing of the heat-resistant member 1 due to thermal shock can be suppressed by suppressing an increase in temperature of the inner portion of the heat-resistant member 1. In other words, the thermal shock resistance of the heat-resistant member 1 can be improved.

When the content percentage of the spinel at the surface of the heat-resistant member 1 is higher than the content percentage of the spinel in the surface layer section, heat conduction from the surface of the heat-resistant member 1 to the surface layer section is suppressed, and thus an increase in the temperature of the surface layer section of the heat-resistant member 1 can be suppressed. An increase in temperature of the inner portion of the heat-resistant member 1 is also suppressed by suppressing an increase in temperature of the surface layer section of the heat-resistant member 1, and therefore fracturing of the heat-resistant member 1 due to thermal shock is suppressed. As a result, the thermal shock resistance of the heat-resistant member 1 can be improved.

The fracture toughness of alumina is greater than that of spinel, and therefore the mechanical strength of alumina is high. Accordingly, the mechanical strength of the inner portion that becomes a fracturing source can be improved by setting the content percentage of the spinel at the inner portion of the heat-resistant member 1 to be less than the content percentage of the spinel in the surface layer section, or in other words, by setting the content percentage of alumina at the inner portion of the heat-resistant member 1 to be relatively high. The thermal shock resistance of the heat-resistant member 1 improves as the mechanical strength becomes higher. Therefore, the heat-resistant member 1 of the embodiment can improve the thermal shock resistance of the heat-resistant member 1.

Furthermore, the mechanical strength of the inner portion that becomes a fracturing source can be improved by setting the content percentage of the spinel in the surface layer section of the heat-resistant member 1 to be less than the content percentage of the spinel at the surface, or in other words, by increasing the content percentage of alumina in a surface layer section closer to the inner portion than the surface. Therefore, the heat-resistant member 1 of the embodiment can improve the thermal shock resistance of the heat-resistant member 1.

The magnitude correlation between the content percentages of spinel at the surface, in the surface layer section, and in the inner portion of the heat-resistant member 1 can be confirmed, for example, by the following method. First, the surface, the surface layer section, and the inner portion of the heat-resistant member 1 are measured using an X-ray diffractometer (XRD). Then, a value A1/B1 is obtained by dividing an X-ray diffraction peak intensity A1 attributable to a (311) plane of the spinel in the surface layer section of the heat-resistant member 1 by an X-ray diffraction peak intensity B1 attributable to a (113) plane of alumina in the surface layer section of the heat-resistant member 1, a value A2/B2 is obtained by dividing an X-ray diffraction peak intensity A2 attributable to the (311) plane of the spinel in the inner portion of the heat-resistant member 1 by an X-ray diffraction peak intensity B2 attributable to the (113) plane of alumina in the inner portion of the heat-resistant member 1, and the value A1/B1 is compared with the value A2/B2. If the comparison result indicates that A1/B1 is larger than A2/B2, it can be said that the content percentage of the spinel in the surface layer section of the heat-resistant member 1 is higher than the content percentage of the spinel in the inner portion. Also, a value A3/B3 is obtained by dividing an X-ray diffraction peak intensity A3 attributable to the (311) plane of the spinel at the surface of the heat-resistant member 1 by an X-ray diffraction peak intensity B3 attributable to the (113) plane of the alumina at the surface of the heat-resistant member 1, and the value A3/B3 is compared with the value A1/B1 described above. If the comparison result indicates that A3/B3 is larger than A1/B1, it can be said that the content percentage of the spinel at the surface of the heat resistant member 1 is higher than the content percentage of the spinel in the surface layer section.

Also, the heat-resistant member 1 according to an embodiment contains anorthite ($CaAl_2Si_2O_8$). The thermal expansion coefficient of anorthite is smaller than that of alumina. Therefore, the thermal shock resistance of the heat-resistant member 1 according to the embodiment can be improved by containing the anorthite.

Also, contained anorthite can improve the corrosion resistance of the heat-resistant member 1 according to the embodiment. During use, the heat-resistant member 1 may be exposed to a corrosive environment such as nitrous oxide gas, ozone, fluorine-containing gas, and an acidic solution.

However, the heat-resistant member 1 of the embodiment is effective even for use in such corrosive environments.

The mechanical strength of anorthite is lower than that of alumina. Therefore, when a large amount of anorthite is contained in the inner portion of the heat-resistant member 1, the thermal shock resistance cannot be sufficiently enhanced. Therefore, the content percentage of the anorthite is preferably higher at the surface layer section of the heat-resistant member 1 than at the inner portion of the heat-resistant member 1. Thus, in a heat-resistant member 1 according to an embodiment, the content percentage of the anorthite in the surface layer section is higher than the content percentage of the anorthite in the inner portion.

For reasons similar to those described above, the content percentage of the anorthite is preferably higher at the surface of the heat-resistant member 1 than in the surface layer section of the heat-resistant member 1. Thus, in a heat-resistant member 1 according to an embodiment, the content percentage of the anorthite at the surface of the heat-resistant member 1 is higher than the content percentage of the anorthite in the surface layer section.

Experimental Data and Analysis Method The presence of spinel ($MgAl_2O_4$) can be confirmed, for example, through X-ray diffraction analysis. Furthermore, the matter of the content percentage of the spinel in the surface layer section of the heat-resistant member 1 being greater than the content percentage of the spinel in the inner portion of the heat-resistant member 1 can be analyzed, for example, by the two methods described below.

First Analysis Method: X-ray Diffraction

The first analysis method uses X-ray diffraction to confirm that a value obtained by dividing the peak intensity of the spinel by the peak intensity of alumina is greater at the surface of the heat-resistant member 1 than in the surface layer section of the heat-resistant member 1, and that the value thereof is greater at the surface layer section of the heat-resistant member 1 than at the inner portion of the heat-resistant member 1.

FIG. 2 is a table presenting measurement results obtained through X-ray diffraction of the heat-resistant member 1 according to embodiments. Specifically, FIG. 2 presents, for four types of lots L1 to L4 of different compounded boron amounts (content in terms of boron trioxide ($B_2O_3$)), a peak intensity ratio of anorthite based on alumina ((peak intensity of anorthite)/(peak intensity of alumina) (%)) and a peak intensity ratio of spinel based on alumina ((peak intensity of spinel)/(peak intensity of alumina) (%)). The compounded boron amounts of lots L1 to L4 were 0.4 mass %, 0.9 mass %, 1.5 mass %, and 2.5 mass %, respectively.

The lots L1 to L4 were fired in a reducing atmosphere. Specifically, the firing time of the lots L1 to L4 was 2 hours. The firing temperature of the lots L1 to L4 was 1410° C. for lot L1, 1390° C. for lot 2, 1370° C. for lot 3, and 1350° C. for lot L4.

ICP analysis results of the boron amounts in the surface layer section and inner portion of lots L1 to L4 are also presented in combination in FIG. 2. Specifically, the boron amount in lot L1 was 0.15 mass % in the surface layer section and 0.26 mass % in the inner portion. The boron amount in lot L2 was 0.38 mass % in the surface layer section and 0.65 mass % in the inner portion. The boron amount in lot L3 was 0.88 mass % in the surface layer section and 1.31 mass % in the inner portion. The boron amount in lot L4 was 1.70 mass % in the surface layer section and 2.30 mass % in the inner portion.

The shape of the test piece of the heat-resistant member 1 was generally 3 mm×4 mm×50 mm after firing. In the XRD measurements, the surface layer section of the heat-resistant member 1 (a section including the outer surface after firing, only a portion from this outer surface to a depth of 0.5 mm was sampled, collected, and ground) and the inner portion of the heat-resistant member 1 (only an inner portion deeper than a depth of 0.5 mm from the outer surface after firing was sampled, collected, and ground) were used as samples. The surface of each test piece was also subjected to XRD measurements. The XRD measurements thereof were implemented by irradiating the outer surface of the non-ground test piece with X-rays. The X-rays irradiated onto the outer surface of the test piece penetrated the test piece to a depth of around several μm from the outer surface thereof. Therefore, the results obtained through XRD measurements of the surfaces of the test pieces can be said to reflect a region from the outer surface of the test piece to a depth around several μm.

As presented in FIG. 2, the peak intensity ratio of the spinel ((peak intensity of the spinel)/(peak intensity of the alumina)) was 20/100=0.20 (-) at the surface, 16/100=0.16 (-) at the surface layer section, and 13/100=0.13 (-) at the inner portion. From these results, it is clear that the content percentage of spinel at the surface is higher than the content percentage of spinel in the surface layer section, and the content percentage of spinel in the surface layer section is higher than the content percentage of spinel in the inner portion. Note that the peak of the alumina occurs at the (113) plane, and the peak of the spinel occurs at the (311) plane.

The peak intensity ratio of the anorthite ((peak intensity of the anorthite)/(peak intensity of the alumina)) was 32/100=0.32 (-) at the surface, 14/100=0.14 (-) at the surface layer section, and 13/100=0.13 (-) at the inner portion. From these results, it is clear that the content percentage of anorthite at the surface is higher than the content percentage of anorthite in the surface layer section, and the content percentage of anorthite in the surface layer section is higher than the content percentage of anorthite in the inner portion. Note that the peak of alumina occurs at the (113) plane, and the peak of the anorthite occurs at the (-204) plane.

Also note that in a case in which it is difficult to separately cut out the surface layer section and the inner portion of the heat-resistant member 1, for example, a cross-section in a direction perpendicular to the outer surface of the heat-resistant member 1 may be measured by micro X-ray diffraction. In this case, for the surface layer section, a portion of a cross-section from the outer surface to 0.5 mm in the depth direction is measured. For the inner portion, a portion of a cross-section separated from the outer surface by more than 0.5 mm in the depth direction is measured. The inner portion is preferably a portion of the cross-section farthest from the outer surface in the depth direction.

Second Analysis Method: SEM and EPMA

The second analysis method is a method in which a scanning electron microscope (SEM) and an electron probe microanalyzer (EPMA) are used. In this method, the equivalent circle diameter, content percentage, and distance between centers of gravity of the spinel are measured. Note that the equivalent circle diameter is, specifically, the equivalent circle diameter of the spinel present in the cross-section of the heat-resistant member 1.

Figure 3:
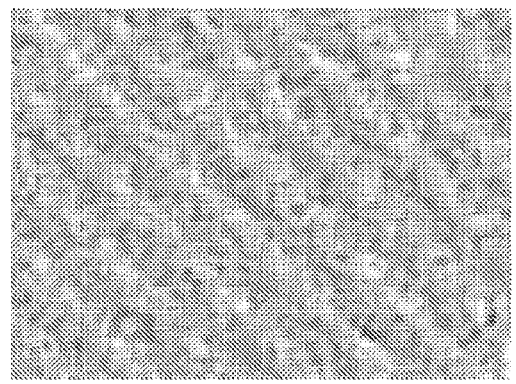
FIG. 3 is an SEM photograph of a surface layer section of a lot L2.
Figure 4:
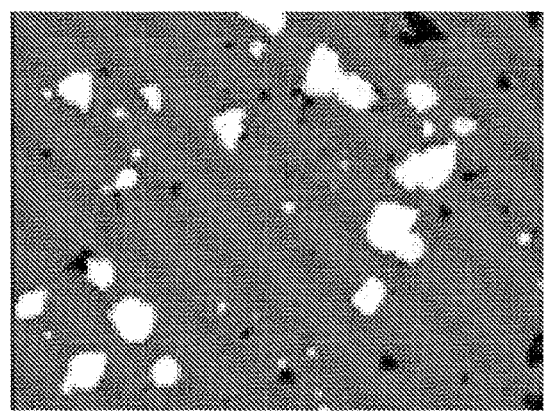
FIG. 4 is an EPMA image at the same location as the SEM photograph in FIG. 3.

FIG. 3 is an SEM photograph of a surface layer section of lot L2 (compounded boron amount of 0.9 mass %). FIG. 4 is an EPMA image at the same location captured in the SEM photograph of FIG. 3.

Observation by SEM and EPMA was implemented at a magnification of 3000 times using, as an observation surface, a mirror surface whose cut surface was polished with a cross section polisher (CP). The EPMA image of FIG. 4 is a composite image showing regions having an abundance of both Al and Mg. In this composite image, the regions having an abundance of both Al and Mg are shown in white.

Image analysis of the EPMA image shown in FIG. 4 was implemented using the image analysis software "A zou kun" (trade name, available from Asahi Kasei Engineering Corporation, hereinafter, mention of the image analysis software "A zou kun" refers to the image analysis software available from Asahi Kasei Engineering Corporation).

A technique called "particle analysis" is used to determine the total proportion of the surface area (surface area ratio (%)) occupied by individual particles (here, a particle is actually a spinel crystal ($MgAl_2O_4:Al_2O_3 \cdot MgO$) in the total measured surface area. A technique called dispersion degree measurement is used to determine the distance between centers of gravity of the particles. As the analysis conditions used in the image analysis software "A zou kun", here, it is only required, for example, that the brightness of particles be set to "bright" (in the case of an EPMA image) or "dark" (in the case of a trace image), the binarization method be set to "automatic", the small figure removal area be set to 0.1 μm, the noise removal filter be set to "yes", the binary image correction be set to "linear separation", and the display method be set to "superposition".

Figures 5, 6:
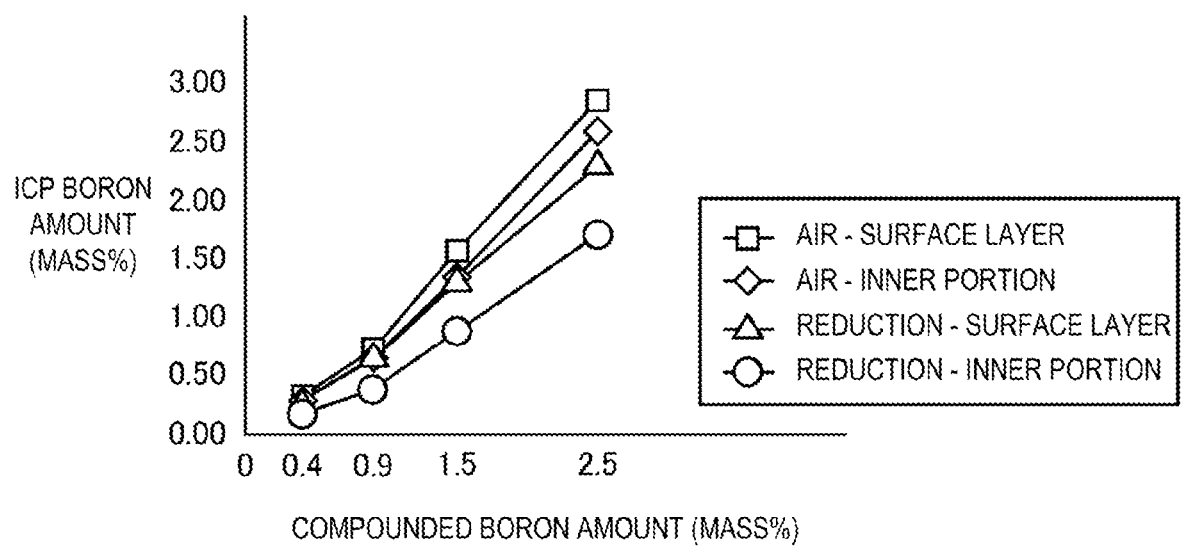
FIG. 5 is a table presenting ICP analysis results of the surface layer section and an inner portion of each air-fired product and reduction-fired product of lots L1 to L4.
FIG. 6 is a graph showing a relationship between a compounded boron amount and a boron amount in a sintered compact, based on the ICP analysis results presented in FIG. 5.

FIG. 5 is a table presenting ICP analysis results of the surface layer section and the inner portion of each air-fired product and reduction-fired product of lots L1 to L4. FIG. 6 is a graph showing a relationship between a compounded boron amount and a boron amount in a sintered compact based on the ICP analysis results presented in FIG. 5.

As presented in FIGS. 5 and 6, it is clear that the content of boron is higher in the surface layer section than in the inner portion. A value obtained by subtracting the ICP boron amount in the surface layer section from the ICP boron amount in the inner portion is 0.1 mass % or higher. Furthermore, the upper limit of the value obtained by subtracting the ICP boron amount in the surface layer section from the ICP boron amount in the inner portion is 0.6 mass %. When this value is too large, the residual stress inside the sintered compact may increase, and the mechanical strength may decrease.

If the content of boron in the surface layer section is equal to or greater than the content of boron in the inner portion, cracking occurs from the surface layer section due to thermal shock applied to the heat-resistant member 1, and the generated crack is easily propagated into the inner portion. On the other hand, when the content of boron in the surface layer section is less than in the inner portion, the fracturing source of the crack is more likely to be the inner portion than the surface layer section. Therefore, the thermal impact resistance of the heat-resistant member 1 can be improved by setting the content of the boron in the surface layer section to be less than in the inner portion.

Figure 7:
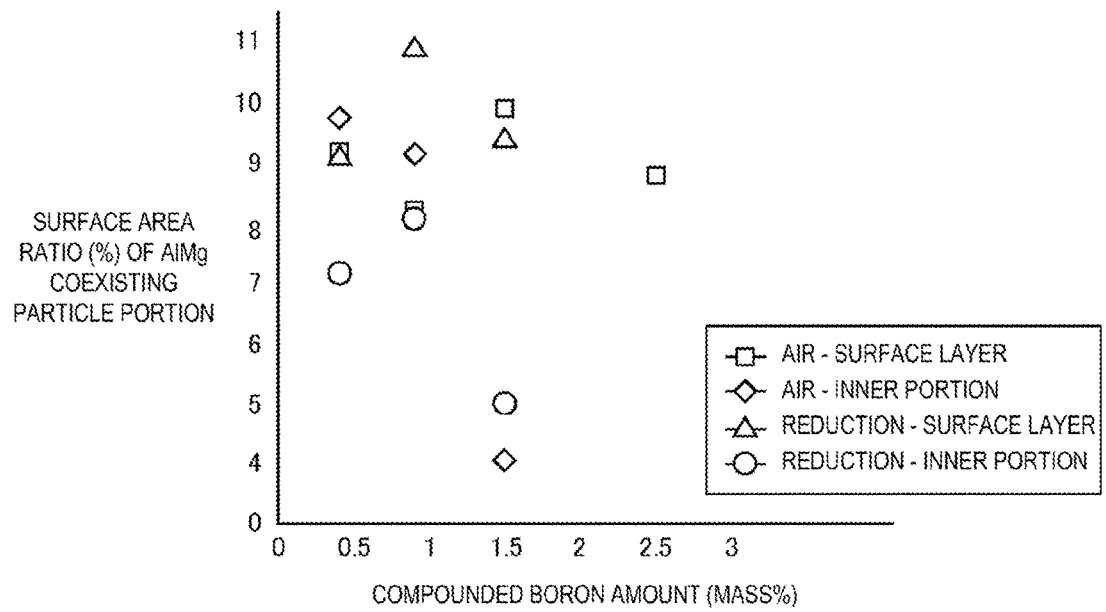
FIG. 7 is a graph showing a relationship between a surface area ratio of an AlMg coexisting particle portion and the compounded boron amount.

FIG. 7 is a graph showing a relationship between a surface area ratio (percent by surface area) of the AlMg coexisting particle portion and the compounded boron amount (mass %) based on the EPMA image.

As illustrated in FIG. 7, it is clear that the surface area ratio of the AlMg coexisting particles, that is, spinel, in the surface layer section is greater than the surface area ratio of the spinel in the inner portion of the heat-resistant member 1. Preferably, the surface area ratio of the spinel is from 9% by surface area to 14% by surface area in the surface layer section, and is from 3% by surface area to 8% by surface area in the inner portion. Note that the percent by surface area may be referred to as a volume percent.

In this manner, the occurrence of cracking in the surface layer section can be suppressed by setting the surface area ratio of the spinel in the surface layer section to be greater than the surface area ratio of the spinel in the inner portion. Therefore, the heat-resistant member 1 can further improve thermal shock resistance.

Figure 8:
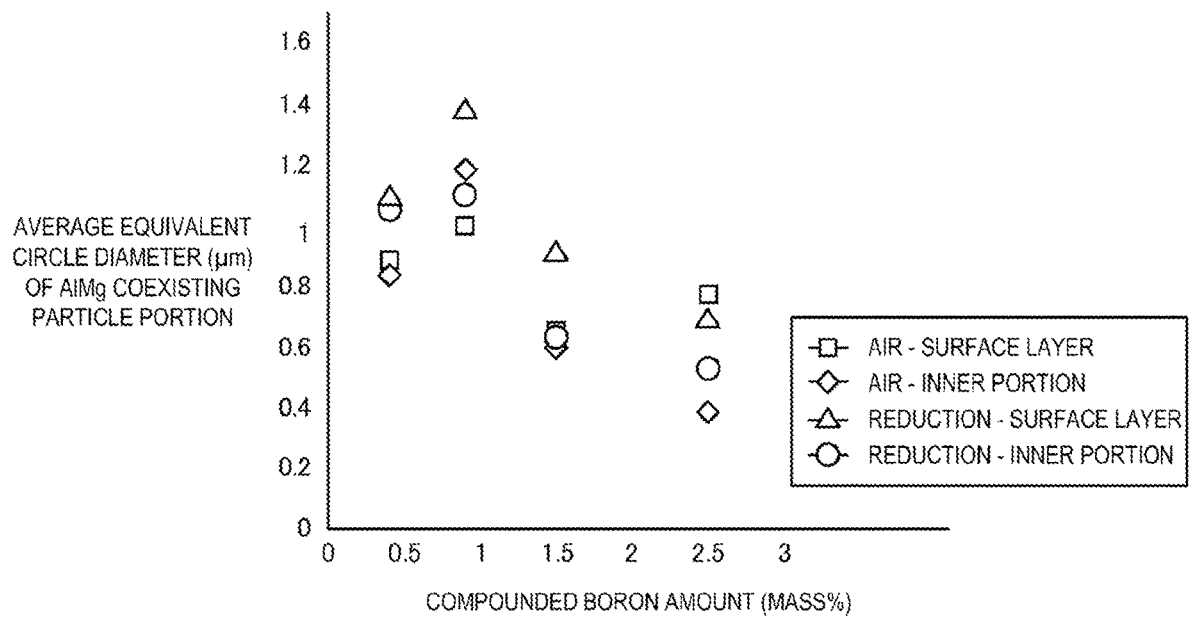
FIG. 8 is a graph showing a relationship between the average equivalent circle diameter of the AlMg coexisting particles and the compounded boron amount.

FIG. 8 is a graph showing a relationship between the average equivalent circle diameter (μm) of AlMg coexisting particles and the compounded boron amount (mass %) based on the EPMA image.

As illustrated in FIG. 8, with the reduction-fired product, the average equivalent circle diameter of the AlMg coexisting particles, or in other words, the average equivalent circle diameter of the spinel in the surface layer section is larger than the average equivalent circle diameter of the spinel in the inner portion. Preferably, the average equivalent circle diameter of the spinel is from 0.8 μm to 2 μm in the surface layer section and from 0.3 μm to 1 μm in the inner portion.

When spinel crystals that are smaller than the spinel crystals of the surface layer section are present in the inner portion, even when a thermal shock is applied to the heat-resistant member 1, the occurrence of cracking from the surface layer section to the inner portion can be prevented by the small spinel crystals of the inner portion. Therefore, the thermal shock resistance of the heat-resistant member 1 can be further improved by setting the average equivalent circle diameter of spinel in the surface layer section to be smaller than the average equivalent circle diameter of the spinel in the inner portion.

Figure 9:
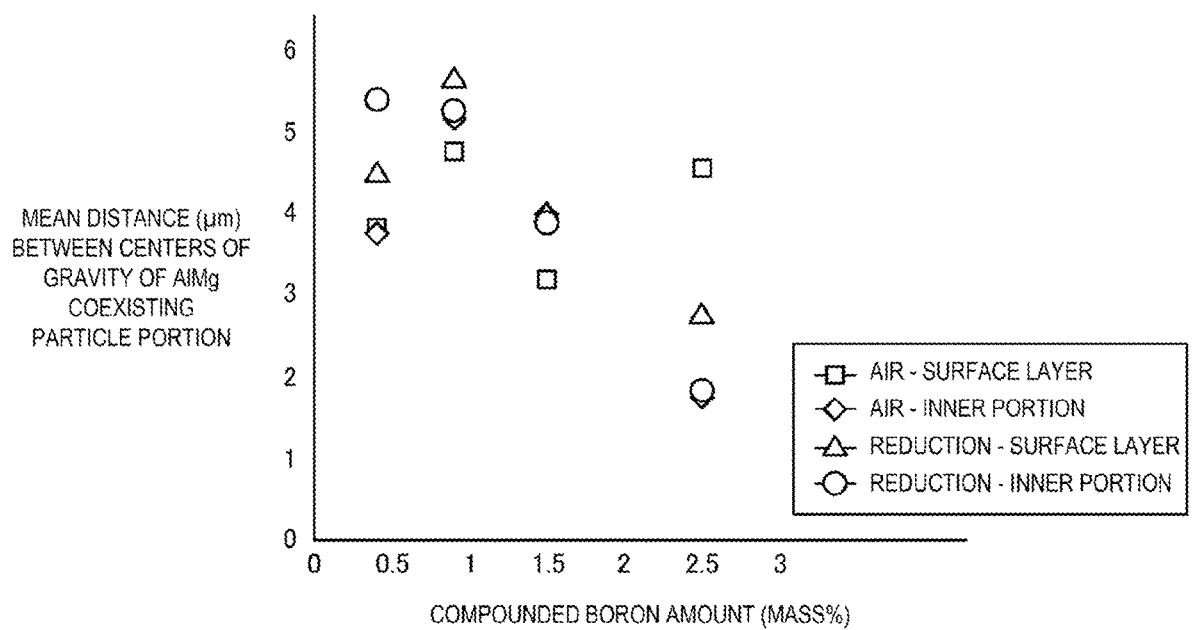
FIG. 9 is a graph showing a relationship between a mean distance between centers of gravity of the AlMg coexisting particles and the compounded boron amount.

FIG. 9 is a graph showing a relationship between a mean distance (μm) between centers of gravity of the AlMg coexisting particles and the compounded boron amount (mass %) based on the EPMA image.

As illustrated in FIG. 9, the mean distance between centers of gravity of the AlMg coexisting particles, or in other words, the mean distance between centers of gravity of the spinel in the surface layer section is larger than the mean distance between centers of gravity of the spinel in the inner portion. Preferably, the mean distance between centers of gravity of the spinel is from 3 μm to 8 μm. This can further improve the thermal shock resistance.

Method for Manufacturing Heat-resistant Member 1

Next, a method for manufacturing the heat-resistant member 1 will be described below. Here, a case in which the heat-resistant member 1 is formed from an aluminum oxide-based ceramic is described as an example.

An aluminum oxide ($Al_2O_3$) powder is prepared as a primary raw material. A silicon oxide ($SiO_2$) powder, a calcium carbonate ($CaCO_3$) powder, a magnesium carbonate ($MgCO_3$) powder and a boron trioxide ($B_2O_3$) powder are prepared as sintering aids.

The $Al_2O_3$ powder, the $SiO_2$ powder, the $CaCO_3$ powder, and the $MgCO_3$ powder are mixed such that the content of Al in terms of $Al_2O_3$ is from 70 mass % to 92 mass %. The mixing ratio at this time results in the following composition. That is, the Al contained in a thermal shock-resistant container is from 70 mass % to 92 mass % in terms of $Al_2O_3$, and a total of the values of Si in terms of $SiO_2$, Ca in terms of CaO, and Mg in terms of MgO is from 8.5 mass % to 29 mass %.

The content of Si in terms of $SiO_2$ is from 4.5 mass % to 17 mass %, the content of Ca in terms of CaO is from 1 mass % to 9 mass %, and the content of Mg in terms of MgO is from 1 mass % to 5 mass %. Furthermore, the content of B in terms of $B_2O_3$ is from 0.5 mass % to 2.5 mass %.

A primary slurry is prepared by adding ion-exchanged water and a dispersing agent to a mixed powder of the $Al_2O_3$ powder, the $SiO_2$ powder, the $CaCO_3$ powder, and the $MgCO_3$ powder, and subjecting the mixture to wet grinding by a well-known method such as ball milling, for example. The particle size of the powder in the primary slurry is from 1 μm to 3 μm. This particle size is the particle size ($D_{50}$) at which, when laser diffraction is used and the volume ratio of particles from the particle size of small particles to the particle size of large particles is summed, the ratio to the cumulative volume of all particles corresponds to 50 vol %.

A binder is then added to the primary slurry at an amount of from 6 parts by mass to 10 parts by mass per 100 parts by mass of solid content, and the materials are mixed to prepare a secondary slurry.

The secondary slurry is then spray-dried to produce granules.

Subsequently, the produced granules are uniaxially press molded into a container shape and the like, and a powder compact is produced.

The powder compact is then fired in a hydrogen atmosphere or in a reducing gas containing hydrogen at an amount from 5 vol % to 95 vol %. The firing temperature is such that the maximum temperature is in a range from 1250° C. to less than 1500° C., and the firing holding time at the maximum temperature is from 10 minutes to 4 hours. The gas containing hydrogen is preferably an ammonia decomposition gas of 75% hydrogen and 25% nitrogen because the heat-resistant member 1 is easily manufactured using such a gas. The content of B in terms of $B_2O_3$ in the surface layer section of the heat-resistant member 1 can be reduced to less than the content of B in terms of $B_2O_3$ in the inner portion by firing in the reducing gas. At the same time, the content of the spinel in the surface layer section of the heat-resistant member 1 can be increased to greater than the content of the spinel in the inner portion.

The composition after firing is the same as the compounding composition with the exception of $B_2O_3$. The $B_2O_3$ evaporates during firing (see the graph of the compounded boron amount and the ICP boron amount: $B_2O_3$ (mass %), the data is an average of the entire sintered compact).

As is clear from the manufacturing method described above, the heat-resistant member 1 includes an outer surface after firing of the outer surface of the heat-resistant member 1. However, the entire outer surface of the heat-resistant member 1 does not necessarily need to be the outer surface after firing. A portion of the outer surface of the heat-resistant member 1 may be machined through polishing or the like. Thermal shock resistance can be improved if at least 80% by surface area of the outer surface of the heat-resistant member 1 is configured by the outer surface after firing.

In order to manufacture a heat-resistant member 1 in which the content percentage of spinel in the surface layer section is higher than the content percentage of spinel in the inner portion, preferably, the maximum temperature is within a range from 1280° C. to less than 1480° C., and the firing holding time at the maximum temperature is from 10 minutes to 2 hours. The same applies to a case of manufacturing a heat-resistant member 1 in which the content percentage of spinel at the surface is higher than the content percentage of spinel in the surface layer section.

In order to manufacture a heat-resistant member 1 for which a value A1/B1 is from 0.1 to 0.22, the value A1/B1 being obtained by dividing an X-ray diffraction peak intensity A1 attributable to a (311) plane of the spinel in the surface layer section by an X-ray diffraction peak intensity B1 attributable to a (113) plane of alumina in the surface layer section, and a value A2/B2 is from 0.05 to 0.18, the value A2/B2 being obtained by dividing an X-ray diffraction peak intensity A2 attributable to the (311) plane of the spinel in the inner portion by an X-ray diffraction peak intensity B2 attributable to the (113) plane of alumina in the inner portion, preferably the maximum temperature is set within a range from 1330° C. to less than 1450° C., and the firing holding time at the maximum temperature is set from 10 minutes to 2 hours.

Similarly, in a method for manufacturing a heat-resistant member 1 for which the content of boron in the surface layer section of the heat-resistant member 1 is less than the content of the boron in the inner portion by an amount of from 0.1 mass % to 0.8 mass %, preferably, the maximum temperature is set within a range from 1280° C. to less than 1480° C., and the firing holding time at the maximum temperature is set from 10 minutes to 2 hours.

Similarly, in a method for manufacturing a heat-resistant member 1 in which the content percentage of spinel in the surface layer section of the heat-resistant member 1 is greater than the content percentage of spinel in the inner portion, and the content percentage of spinel is set from 9% by surface area to 14% by surface area in the surface layer section and is set from 3% by surface area to 8% by surface area in the inner portion, the maximum temperature is set within a range from 1330° C. to less than 1420° C., and the firing holding time at the maximum temperature is set from 10 minutes to 2 hours.

In order to obtain an average equivalent circle diameter of the spinel in the inner portion of the heat-resistant member 1 that is smaller than the average equivalent circle diameter of the spinel in the surface layer section, with the average equivalent circle diameter being from 0.8 μm to 2 μm in the surface layer section and from 0.3 μm to 1 μm in the inner portion, the temperature decrease rate when firing is preferably set from 200° C./hour to 800° C./hr.

In order to set the mean distance between centers of gravity of spinel in the surface layer section to a range from 3 μm to 8 μm, the particle size of the powder in the primary slurry is preferably such that the particle size at a cumulative volume ratio of 50% as measured by laser diffraction is from 0.7 μm to 1.2 μm.

To cause the heat-resistant member to contain anorthite, preferably, the temperature is held at the maximum temperature during firing, after which the temperature is held at a constant temperature between 1100° C. to 1200° C., inclusive, for 10 hours or more.

To increase the content percentage of anorthite in the surface layer section to higher than the content percentage of anorthite in the inner portion, preferably, the temperature is held at the maximum temperature, and then held for 20 hours or more at a constant temperature between 1100° C. and 1200° C., inclusive. The same applies for a case in which the content percentage of anorthite at the surface is to be set higher than the content percentage of anorthite in the surface layer section.

EXAMPLES

Example 1

The compounding compositions of lots L2 to L4 described above were as follows.
$Al_2O_3$: 80 mass %
$SiO_2$: 12.1 mass %, ($B_2O_3$=0.9 mass %)
CaO: 5 mass %
MgO: 2 mass %
$B_2O_3$: 0.9 mass %, 1.5 mass %, 2.5 mass %

When the amount of $B_2O_3$ was increased or decreased by more than 0.9 mass %, the amounts of $SiO_2$, CaO, and MgO were increased or decreased while maintaining a constant ratio of $SiO_2$:CaO: MgO. The maximum firing temperature was 1400° C., and the firing time was 2 hours. The reducing atmosphere was $N_2$: $H_2$=3: 1.

Thermal Shock Resistance Test

The sample shape was a 3 mm×4 mm×50 mm sintered compact. The sintered compact was unpolished, and the sample after firing was used as is in the test.

The sample was heated and held at a constant temperature (denoted by T2 (° C.)) for 10 minutes. After being held at T2 (° C.), the sample was dropped into water having a temperature of T1=25° C. When the sample was dropped into water, the sample was subjected to thermal shock. The sample dropped into the water was then collected and dried, after which the three-point bending strength was measured. At this time, the method for measuring the three-point bending strength was the same as the method for measuring the three-point bending strength at room temperature (25° C.) in accordance with JIS R1601-2008, with the exception that the sample was a 3 mm×4 mm×50 mm sintered compact (an unpolished sample after firing was used as is in the test). The temperature T2 (° C.) was increased, and a temperature difference (T2−T1(° C.)) immediately before the three-point bending strength began to decrease rapidly was used as a temperature having thermal shock resistance.

The results of the thermal shock resistance test were as follows.

Lot L2 (compounded boron amount of 0.9 mass %): thermal shock resistance temperature of 285° C.

Lot L3 (compounded boron amount of 1.5 mass %): thermal shock resistance temperature of 250° C.

Lot L4 (compounded boron amount of 2.5 mass %): thermal shock resistance temperature of 200° C.

Example 2

The compounding composition was changed as follows, and a thermal shock resistance test similar to that described above was implemented. Conditions other than the compounding composition were the same as in Example 1.
$Al_2O_3$: 89 mass %,
$SiO_2$: 7 mass %
CaO: 1 mass %,
MgO: 2 mass %
$B_2O_3$: 1 mass %
Thermal shock resistance temperature: 200° C.

Example 3

The compounding composition was changed as follows, the firing temperature was changed to 1450° C., and a thermal shock resistance test similar to that described above was implemented. The other conditions were the same as in Example 1.
$Al_2O_3$: 92 mass %,
$SiO_2$: 5.5 mass %
CaO: 1.5 mass %,
MgO: 1 mass %
$B_2O_3$: 0.5 mass %
Thermal shock resistance temperature: 240° C.

Example 4

The compounding composition was changed as follows, the firing temperature was changed to 1350° C., and a thermal shock resistance test similar to that described above was implemented. The other conditions were the same as in Example 1.
$Al_2O_3$: 77 mass %,
$SiO_2$: 15 mass %
CaO: 4.5 mass %,
MgO: 3 mass %
$B_2O_3$: 0.5 mass %
Thermal shock resistance temperature: 200° C.

Comparative Example 1

The compounding composition of lot L1 was as follows. Conditions other than the compounding composition were the same as in Example 1.
$Al_2O_3$: 80 mass %
$SiO_2$: 12.6 mass %
CaO: 5 mass %,
MgO: 2 mass %
$B_2O_3$: 0.4 mass %
Thermal shock resistance temperature: 193° C.

Comparative Example 2

The analysis results of lot L4 produced by air firing were as follows.

Intensity ratio of spinel in surface layer section ((peak intensity of spinel)/(peak intensity of alumina) (%)): 4.1

Intensity ratio of spinel in inner portion: 8.7

Thermal shock resistance temperature: 193° C.

From the results of Examples 1 to 4 and Comparative Examples 1 and 2, it is clear that the heat-resistant member 1 is preferably produced at least at a condition at which the thermal shock resistance temperature is 200° C. or higher.

As described above, the heat-resistant member according to an embodiment (for example, the heat-resistant member 1) contains alumina as a main component, as well as magnesium aluminate and boron. In addition, in the heat-resistant member according to the embodiment, the content percentage of magnesium aluminate in the surface layer section including the surface is higher than the content percentage of magnesium aluminate in an inner portion deeper than the surface layer section in the depth direction from the surface. Thus, the heat-resistant member according to the embodiment exhibits excellent thermal shock resistance.

REFERENCE SIGNS

1: Heat-resistant member

The invention claimed is:
1. A heat-resistant member comprising:
alumina as a main component;
magnesium aluminate; and
boron,
wherein
a content percentage of the magnesium aluminate at a surface is higher than a content percentage of the magnesium aluminate in a surface layer section located directly below the surface.
2. The heat-resistant member according to claim 1, wherein the content percentage of the magnesium aluminate in the surface layer section is higher than a content percentage of the magnesium aluminate at an inner portion deeper than the surface layer section in a depth direction from the surface.

3. The heat-resistant member according to claim 1, further comprising anorthite.

4. The heat-resistant member according to claim 3, wherein a content percentage of the anorthite at the surface of the heat-resistant member is higher than the content percentage of the anorthite at the surface layer section.

5. The heat-resistant member according to claim 1, wherein an average equivalent circle diameter of the magnesium aluminate in the surface layer section is larger than an average equivalent circle diameter of the magnesium aluminate at the inner portion.

6. The heat-resistant member according to claim 1, wherein a distance between centers of gravity of the magnesium aluminate in the surface layer section is greater than a distance between centers of gravity of the magnesium aluminate in the inner portion.

7. The heat-resistant member according to claim 1, wherein the magnesium aluminate is spinel ($MgAl_2O_4$).

8. A heat-resistant member comprising:
   alumina as a main component;
   magnesium aluminate; and
   boron,
   wherein
   a content percentage of the magnesium aluminate in a surface layer section including a surface is higher than a content percentage of the magnesium aluminate at an inner portion deeper than the surface layer section in a depth direction from the surface.

9. The heat-resistant member according to claim 8, wherein a content of the magnesium aluminate at the surface of the heat-resistant member is higher than a content of the magnesium aluminate in the surface layer section.

10. The heat-resistant member according to claim 8, wherein a content of boron in terms of B2O3 in the surface layer section is less than the content of boron in the inner portion.

11. The heat-resistant member according to claim 8, wherein a content percentage of the anorthite in the surface layer section is higher than a content percentage of the anorthite at the inner portion.

12. The heat-resistant member according to claim 11, wherein a content percentage of the anorthite at the surface of the heat-resistant member is higher than the content percentage of the anorthite at the surface layer section.

13. The heat-resistant member according to claim 8, wherein an average equivalent circle diameter of the magnesium aluminate in the surface layer section is larger than an average equivalent circle diameter of the magnesium aluminate at the inner portion.

14. The heat-resistant member according to claim 8, wherein a distance between centers of gravity of the magnesium aluminate in the surface layer section is greater than a distance between centers of gravity of the magnesium aluminate in the inner portion.

15. The heat-resistant member according to claim 8, wherein the magnesium aluminate is spinel ($MgAl_2O_4$).

* * * * *